US005202146A

United States Patent [19]

Singer et al.

[11] Patent Number: 5,202,146

[45] Date of Patent: Apr. 13, 1993

[54] FLAVOR DELIVERY SYSTEM FOR FAT FREE FOODS

[75] Inventors: Norman S. Singer, Highland Park; Suseelan Pookote; Leora C. Hatchwell, both of Buffalo Grove; Gale Anderson, Round Lake Beach; Arlette G. Shazer, Hoffman Estates; Barbara J. Booth, Hinsdale, all of Ill.

[73] Assignee: The Nutrasweet Company, Deerfield, Ill.

[21] Appl. No.: 544,044

[22] Filed: Jun. 25, 1990

Related U.S. Application Data

[63] Continuation of Ser. No. 371,761, Jun. 29, 1989, abandoned, which is a continuation-in-part of Ser. No. 216,681, Jul. 7, 1988, abandoned.

[51] Int. Cl.$^5$ ............................................. A23G 9/00
[52] U.S. Cl. ...................................... 426/613; 426/804; 426/565
[58] Field of Search ............ 426/613, 426, 429, 330.2, 426/651, 581, 330.2, 334, 804, 530, 586, 565

[56] References Cited

U.S. PATENT DOCUMENTS

| 1,444,562 | 2/1923 | Sherman . | |
|---|---|---|---|
| 2,571,867 | 10/1951 | Hall et al. . | |
| 2,847,310 | 8/1958 | Turnbow . | |
| 3,520,699 | 7/1970 | Henning . | |
| 3,732,111 | 5/1973 | Berner et al. . | |
| 3,906,116 | 9/1975 | Quesnel et al. . | |
| 3,944,680 | 3/1976 | van Pelt | 426/586 |
| 4,273,790 | 6/1981 | Bosco et al. . | |
| 4,292,333 | 9/1981 | Bosco et al. . | |
| 4,414,229 | 11/1983 | Bakal et al. . | |
| 4,436,760 | 3/1984 | Verhagen | 426/586 |
| 4,468,408 | 8/1984 | Bosco et al. . | |
| 4,547,385 | 10/1985 | Lindstam | 426/586 |
| 4,634,598 | 1/1987 | Liu et al. . | |
| 4,663,178 | 5/1987 | Gehrig | 426/586 |
| 4,681,769 | 7/1987 | Bennet et al. . | |
| 4,707,367 | 11/1987 | Miller et al. . | |
| 4,732,772 | 3/1988 | Nolte | 426/586 |
| 4,734,287 | 3/1988 | Singer et al. . | |
| 4,769,255 | 9/1988 | Ahmed | 426/586 |
| 4,772,483 | 9/1988 | Nolte | 426/586 |
| 4,797,300 | 1/1989 | Jandacek | 426/549 |
| 4,840,815 | 6/1989 | Meyer | 426/611 |
| 4,855,156 | 8/1989 | Singer | 426/567 |
| 4,880,657 | 11/1989 | Guffey | 426/601 |
| 4,911,946 | 3/1990 | Singer | 426/613 |
| 4,942,054 | 7/1990 | Winer | 426/804 |
| 4,952,413 | 8/1990 | La Barge | 426/804 |
| 4,985,270 | 9/1988 | Singer | 426/613 |

FOREIGN PATENT DOCUMENTS

| 0005290 | 11/1979 | European Pat. Off. . |
| 0129346 | 12/1984 | European Pat. Off. . |
| 1692675 | 9/1971 | Fed. Rep. of Germany . |
| 1496411 | 9/1967 | France . |

OTHER PUBLICATIONS

Lea, C., and Swoboda, P., The Flavour of Aliphatic Aldehydes, Chem. and Indust., 1958, 1289 (1958).
McDaniel, M., et al., Influence of Free Fatty Acids on Sweet Cream Butter Flavor, J. Food Science, 34, 251–254 (1969).
Patton, S., Flavor Thresholds of Volatile Fatty Acids, J. Food Science, 29, 679–680 (1964).

Primary Examiner—Carolyn Paden
Attorney, Agent, or Firm—Marshall, O'Toole, Gerstein, Murray & Bicknell

[57] ABSTRACT

Methods are provided for the delivery of fat soluble flavor compounds into nonfat and low-fat food products in which fat components have been replaced by non-lipid fat substitutes. A flavor delivery system comprising fat globules into which elevated levels of fat soluble flavor compounds have been loaded is incorporated into nonfat and low-fat food products in order that fat soluble flavor compounds are released in a more natural and familiar sequence.

5 Claims, No Drawings

FLAVOR DELIVERY SYSTEM FOR FAT FREE FOODS

This application is a continuation of application Ser. No. 07/371,761, filed Jun. 29, 1989, which is a continuation-in-part of application Ser. No. 216,681 filed Jul. 7, 1988 both now abandoned the disclosure of which is incorporated herein by reference.

BACKGROUND OF THE INVENTION

The present invention relates generally to methods for delivery of flavors to food products and specifically to methods for delivery of fat soluble flavor compounds to nonfat and low-fat food products in which fat components have been replaced by non-lipid fat substitutes. With the development of novel nonfat and low-fat food products such as those described by Singer, et al. U.S. Pat. No. 4,734,287 wherein fats or oils in food products are replaced by proteinaceous materials, there has developed a need for the development of compounds or flavor enhancers which can create a natural flavor impression reproducing that found in conventional high-fat foods. Full fat products possess a temporal flavor profile that is characteristically absent in food products wherein much of the fat is removed in an effort to reduce calories.

Differences in the efficacy of flavor components depend to a large degree upon their relative distributions between the fat and aqueous phases present in most food products. Patton, S., Flavor Thresholds of Volatile Fatty Acids, *J. Food Science*, 29, 679–680 (1964) discloses that long-chain volatile fatty acids have low flavor thresholds in water (i.e., can be detected at low concentrations) and higher flavor thresholds in oil. Aliphatic aldehydes have been shown to demonstrate the same flavor phenomena. See, Lea, C., and Swoboda, P., The Flavor of Aliphatic Aldehydes, *Chem. and Indust.*, 1958, 1289 (1958). The reverse principle, however, has been known to hold true with respect to short-chain fatty acids McDaniel, M., et al., Influence of Free Fatty Acids on Sweet Cream Butter Flavor, *J. Food Science*, 34, 251–253 (1969).

In food products wherein the fat components which are normally present have been replaced by non-lipid substitutes for fat, the retention and natural presentation of flavors associated with fat soluble flavor compounds is difficult due to the absence of fat within which such flavor compounds can be incorporated. Non-lipid fat substitutes which reproduce the organoleptic character of fats and oils tend to retain and present fat soluble flavor compounds in a manner different from fats. Thus, while blends of flavor ingredients have been mixed with various non-caloric and low-caloric carriers in an attempt to flavor low-fat foods, the resulting mixtures provide only a short, intense and fleeting flavor profile wherein flavor components are perceived for only very short periods of time in an unfamiliar or unnatural pattern. Accordingly, the goal of preparing flavoring ingredients which provide to nonfat and low-fat food products the full temporal characteristics of full fat foods has been elusive.

SUMMARY OF THE INVENTION

The present invention provides a system for delivery of fat soluble flavor compounds into nonfat and low-fat food products in which fat components have been replaced by non-lipid fat substitutes so as to reproduce the natural taste impression of conventional full fat food products. Specifically, the invention provides a system for the delivery of fat soluble flavor compounds through the loading of elevated levels of the flavor compounds into carrier fat globules so that the natural flavor of these compounds can be incorporated into food products while at the same time adding minimal amounts of fat. The invention provides methods for the manufacture and use of the flavor delivery system as well as improved nonfat and low-fat food products comprising the flavor delivery system.

DETAILED DESCRIPTION OF THE INVENTION

The present invention provides a system for the delivery of fat soluble flavor components into nonfat and low-fat food products The invention relates to the partitioning of flavor components with respect to their solubility in fat and water. Flavor compounds with high solubility in fat can be loaded at elevated levels many times greater than their ordinary concentration into a fat globule. This flavor loaded fat globule acts as a carrier for incorporation into the low-fat food system. The flavor is then released in a more natural and familiar sequence and rate as the fat globules are warmed by the mouth, thereby generating a more natural temporal flavor profile which is characteristic of the flavor profile of conventional high-fat foods. Water soluble flavor components, on the other hand, are readily released in low or nonfat foods for sensory perception resulting in the usual pattern of perception for such components since this process doesn't impede or perturb their pattern of release. Therefore, by increasing the flavor load of these fat soluble compounds into fat globules, the flavor sensation of full fat foods is achieved through the incorporation of only a deminimus amount of fat.

Specifically, the flavor compounds to be incorporated into the nonfat food product are mixed with a fat, such as butterfat, which may be presented as a dairy cream at a temperature above the melting point of the fat. This promotes loading (partitioning) of the fat soluble flavor components into the fat globule. The fat soluble components may be in admixture with water soluble components as is found in many natural flavor extracts with no adverse effects upon the process High speed mixing of this blend prevents separation of the components and the fat and provides maximum exposure and therefore maximum opportunity for partition. Subsequent homogenization results in an emulsion comprising stabilized fat globules containing the fat soluble flavor compounds. The emulsion is then cooled and may be added to nonfat and low-fat food products for flavor enhancement. The process of loading the fat soluble flavor compounds into the fat globule may be carried out at atmospheric pressure Alternatively, it may be carried out at elevated pressures such as would be produced in HTST pasteurization equipment. A continuous process could be carried out in which fat soluble flavor compounds and the fat globules could be mixed, homogenized and later cooled under elevated pressure in an HTST pasteurization device.

The fat soluble flavor compounds are loaded into the fat globules at elevated concentrations up to their saturation point. In order to minimize the amount of fat incorporated into a nonfat or low-fat food product in the form of the flavor system, it is generally desired that the level of fat soluble flavor compounds be maximized in the fat globule. Nevertheless, the precise amounts of fat soluble flavor compounds incorporated into the fat globules and the concentrations of fat globules incorporated into food products may be varied according to the circumstances of a particular application.

Fat globules that may serve as a suitable carrier system may be any naturally occurring food grade fat such as, but not limited to, butterfat, beef fat, tallow, vegetable oils and emulsifiers. Preferred fats include butterfat and cholesterol free fats. In addition to comprising food grade fats, the fat globules of the present invention may also be comprised of lipophilic non-caloric fat substitutes. Suitable materials are contemplated to include synthetic fat substitutes such as sucrose polyester materials, natural materials such as jojoba oil and blends thereof together and with food grade fats and oils.

The present invention may be used to deliver virtually any natural or artificial food grade fat soluble flavor component. The invention is particularly useful with vanilla extract, vanillin, starter distillates, lipolyzed oils and botanical extracts.

The invention provides improved nonfat and low-fat food products in which fat components have been replaced by non-lipid fat substitutes. The fat globules comprising the fat soluble flavor compounds may be introduced to the food products at concentrations of less than about 1.0% by weight of the food product. In cases where it is desired to maintain a very low-fat level in the food product, the fat globules may be added at concentrations less than about 0.2% by weight of the food product. Preferred nonfat and low-fat food products include those in which fat components have been replaced by a proteinaceous marcocolloid such as described in U.S. Pat. No. 4,734,287. Food products in which the flavoring system is particularly useful include those products which are nonfat or low-fat analogs of ice cream and other frozen dessert products; high acid products such as salad dressings and mayonnaise; solid dairy products such as cheeses and cream cheese; fermented dairy products such as sour cream and yogurt; dairy products such as milk and cream; semi-solid products such as icings and spreads; whipped toppings and spreads.

EXAMPLE 1: FLAVORING OF HIGH-FAT AND LOW-FAT FOODS

According to this example, 50 ml each of skim milk and heavy cream were flavored with 0.5 ml vanilla extract. Taste testing indicated that the mixture of skim milk and vanilla extract had a taste which was characterized as harsh, intense and fleeting with woody and alcoholic characteristics. The mixture of cream and vanilla extract was characterized as having a much milder, natural and lingering vanilla character, which blended more tightly into the dairy flavor complex of the cream. This demonstrates the important role played by fat in presenting a flavor impression that is perceived as natural.

EXAMPLE 2: VANILLA FLAVOR DELIVERY SYSTEM

According to this example, a vanilla flavor delivery system was formed using heavy cream (% Fat =43), vanilla extract and a cream flavor was used to make an ice cream-like frozen dessert.

| Ingredients | Flavor System (%) | Frozen Dessert (%) |
|---|---|---|
| Heavy Cream | 55.76 | 0.58 |
| Vanilla Extract | 28.85 | 0.30 |
| Cream Flavor | 15.39 | 0.16 |
| | 100.00 | 1.04 |

The ingredients listed above were combined in a jacketed kettle and warmed to 104° F. while mixing at a medium speed in a Dispermat mixer equipped with a 70–90 mm diameter Cowles-type impeller (UMA-Getzmann GMBH). This mixture was homogenized at 3,000 psi and then cooled to 60° F. while being mixed by the Dispermat to yield the vanilla flavor delivery system comprising globules of milk fat into which the fat soluble flavor compounds of the vanilla extract and cream flavor were loaded. The flavor delivery system was then added to a fat-free frozen dessert mixture at a concentration of 1.04% (thus adding 0.25% fat to the dessert mixture) and the mixture was frozen and whipped as in the preparation of conventional ice cream. The product so made had a full, rich and lingering vanilla flavor with a natural vanilla character.

EXAMPLE 3: CREAM CHEESE-TYPE PRODUCT

According to this example, a cream cheese-type product in which natural dairy fat had been replaced with a proteinaceous fat substitute was provided with butter and cream flavor by means of a flavor delivery system according to the invention. The flavor delivery system was formed by blending 5 parts (by weight) butter flavor (OTANI) and 5 parts cream flavor (Grindsted) into 500 parts Half and Half (11.7% butterfat, Deans Foods) using a Dispermat mixer at 500 rpm. The cream/flavor mixture was heated to 145° F. and was then homogenized at 145° F. at 2,500 psi using a Rannie High Pressure Homogenizer (Rannie a/s, Albertslund, Denmark) to form the flavor delivery system.

| Ingredients | Source | Parts |
|---|---|---|
| Farmers Cheese | Michigan Farms | 3490 |
| Pressed Dry Curd Cottage Cheese | Deans | 2459 |
| Proteinaceous Fat Substitute | | 3300 |
| Meyprogat 150 (2%) | Hi-Tek Polymer | 60 |
| Locust Bean Gum 175 (2%) | Hi-Tek Polymer | 120 |
| Carageenan CSMI (2%) | Hercules | 30 |
| Salt | Diamond Crystal | 30 |
| Cream Flavor | Grindsted | 5 |
| Butter Flavor | OTANI | 5 |
| Half and Half (11.7% fat) | Deans | 500 |
| Potassium Sorbate | Tri-K Industries | 1 |
| | | 10,000 |

The flavor delivery system was incorporated into a low-fat cream cheese-type product produced according to the following method. Farmers Cheese (3,490 parts, Michigan Farms) and Pressed Dry Curd Cottage Cheese (2,459 parts, Deans Foods) were ground a chopper for 15 minutes and transferred to a Dispermat mixer. Proteinaceous fat substitute prepared according to Singer, et al., U.S. Pat. No. 4,734,287 was added (3,300 parts) to the cheeses in the mixer which were then heated to 165° F. A mixture of prehydrated gums including Meyprogat 150 (2%) (60 parts, Hi-Tek Polymer), locust bean gum 175 (2%) (120 parts, Hi-Tek Polymer) and carageenan CSMI (2%) (30 parts, Hercules) were added to the mixer and blended for one minute. At this time, 30 parts salt (Alberger Fine Flake, Diamond Crystal), the flavor delivery system described above and potassium sorbate (1 part, Tri-K Industries) were added to the mixer. The ingredients were then homogenized at 11,000 psi at 165° F. and were packed off at 160° F. The product so produced had the flavor of a conventional cream cheese product.

EXAMPLE 4: RANCH DRESSING PRODUCT

According to this example, a ranch dressing product in which natural fat had been replaced with a proteinaceous fat substitute was provided with a flavor delivery system to improve the lingering aftertaste characteristic which is desired of salad dressings.

| Ingredients | Source | Parts |
|---|---|---|
| Buttermilk, Cultured Low-fat | Dean Foods | 41675 |
| Skim Milk | Dean Foods | 10957 |
| Xanthan Gum | Kelco | 110 |
| Propylene Glycol aginate | Kelco | 90 |
| Modified Food Starch | Staley | 1000 |
| Maltodextrin | Staley | 2000 |
| Sugar | C & H | 1000 |
| Corn Syrup Solids 35K | Staley | 5000 |
| Garlic Powder | Gilroy | 300 |
| Onion Powder | Gilroy | 300 |
| Black Paper | Saratoga Seasonings | 60 |
| Parsley | Saratoga Seasonings | 40 |
| Nonfat Dry Milk | Land O'Lakes | 3000 |
| Monosodium Glutamate | Saratoga Seasonings | 250 |
| Potassium Sorbate | Tri-K Industries | 1000 |
| Proteinaceous Fat Substitute | | 20000 |
| Whole Egg | Waldbaum | 2000 |
| Mixed Tocopherols | Henkel | 6 |
| Soybean Oil | ADM | 2000 |
| Liponate GC | Lipo Chem | 2 |
| Dairy Flavor | IFF 73568691 | 50 |
| Mouthfeel Flavor | IFF 13561188 | 300 |
| Garlic Flavor | Takasago TAK-7516 | 10 |
| Onion Flavor | F & C 080841 | 400 |
| Celery Oil at 0.01% in Vegetable Oil | McCormick Strange/Plant | 100 |
| White Distilled Vinegar | Fleischmann 100 gr | 6000 |
| Sodium Acetate | Miles | 100 |
| Flavor | Givaudan TPS 6551 | 200 |
| Salt | Diamond Crystal | 2050 |
| | | 100,000 |

The flavor delivery system was formed by blending fat soluble flavor ingredients with soybean oil in a Dispermat high speed mixer. To 2000 parts soybean oil was mixed Liponate GC, a caprylic capric triglyceride (2 parts, Lipo Chem), mouthfeel flavor (300 parts, IFF 13561188), garlic flavor (10 parts, Takasago TAK-7516), onion flavor (500 parts, F&C 80841), celery flavor 0.01% in oil (100 parts, McCormick), mixed tocopherols (6 parts, Henkel) and dairy flavor (50 parts, IFF 73568691). The blended ingredients were warmed to 145° F. and then homogenized at 2,500 psi prior to being cooled to room temperature.

The flavor delivery system was incorporated into a low-fat ranch dressing product produced according to the following method. Cultured low-fat buttermilk and skim milk were added to a batch kettle according to the proportions presented in the table above. The gums, starch, maltodextrin, sugar, corn syrup solids, spices, nonfat milk, monosodium glutamate and potassium sorbate preservatives were dry-blended in the proportions presented above and were then added to the kettle under shearing conditions. Proteinaceous fat substitute prepared according to Singer, et al. U.S. Pat. No. 4,734,287 and whole egg were added under shear conditions to blend them into the mixture and the flavor delivery system was then also added.

Vinegar, sodium acetate and Givaudan TPS 6551 flavor were then added slowly to acidify the mixture and salt was added. The mixture was homogenized at 2,500 psi and was then heated to 180° F. and held at that temperature for 30 seconds before being cooled to 165° F. and packed off. The product so produced had the flavor of a conventional high-fat ranch dressing product.

From the foregoing description, one of skill in the art will recognize numerous variations and modifications of the invention to adapt it to particular usages. Consequently, only such limitations should be placed on the invention as appear in the following claims.

What is claimed is:

1. A method for the delivery of fat soluble flavor compounds into nonfat and low-fat food products selected from the group consisting of analogs of non-vanilla frozen dessert products in which fat components have been replaced by non-lipid fat substitutes comprising the step of introducing into said food products less than 1% by weight of fat globules comprising elevated levels of fat soluble flavor compounds partitioned therein.

2. The method of claim 1 wherein said fat globules are introduced into said food products at a concentration of less than 0.2% by weight.

3. The method of claim 1 wherein said fat globules comprise material selected from the group consisting of butterfat, beef fat, tallow, vegetable oils and emulsifiers.

4. The method of claim 1 wherein said fat globules comprise material selected from the group consisting of sucrose polyesters and jojoba oil.

5. The method of claim 1 wherein said fat globules comprising fat soluble flavor compounds are incorporated in the form of an emulsion.

* * * * *